(12) United States Patent
Frank et al.

(10) Patent No.: US 12,109,894 B2
(45) Date of Patent: Oct. 8, 2024

(54) METHOD FOR OPERATING A MOTOR VEHICLE, DEVICE FOR A MOTOR VEHICLE, MOTOR VEHICLE

(71) Applicant: Robert Bosch GmbH, Stuttgart (DE)

(72) Inventors: Felix Frank, Gemuenden am Main (DE); Peter Feuerstack, Ludwigsburg (DE); Thomas Friedrich, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 17/782,686

(22) PCT Filed: Nov. 17, 2020

(86) PCT No.: PCT/EP2020/082325
§ 371 (c)(1),
(2) Date: Jun. 6, 2022

(87) PCT Pub. No.: WO2021/110401
PCT Pub. Date: Jun. 10, 2021

(65) Prior Publication Data
US 2023/0012312 A1    Jan. 12, 2023

(30) Foreign Application Priority Data

Dec. 6, 2019    (DE) .................... 10 2019 219 022.7

(51) Int. Cl.
*B60L 15/20*     (2006.01)
*B60L 7/10*      (2006.01)

(52) U.S. Cl.
CPC ............. *B60L 15/2018* (2013.01); *B60L 7/10* (2013.01); *B60L 2240/12* (2013.01); *B60L 2240/423* (2013.01); *B60L 2240/54* (2013.01)

(58) Field of Classification Search
CPC .... B60L 15/2018; B60L 7/10; B60L 2240/12; B60L 2240/423; B60L 2240/54
See application file for complete search history.

(56) References Cited

U.S. PATENT DOCUMENTS

2015/0239350 A1    8/2015    Maucher et al.

FOREIGN PATENT DOCUMENTS

| CN | 102457182 A | 5/2012 |
|---|---|---|
| DE | 102016207280 A1 | 11/2017 |
| JP | 2012060710 A | 3/2012 |

OTHER PUBLICATIONS

Translation of International Search Report for Application No. PCT/EP2020/082325 dated Feb. 19, 2021 (2 pages).

*Primary Examiner* — Michael D Lang
(74) *Attorney, Agent, or Firm* — Michael Best & Friedrich LLP

(57) ABSTRACT

The invention relates to a method for operating a motor vehicle (1) which has an electrical machine (7) with at least three phases, an electrical energy store (13) and a power electronics system (12) having a plurality of switching elements, wherein the switching elements of the power electronics system (12) are actuated for electrically connecting the phases to the energy store (13), in order to produce a generator deceleration moment. Provision is made for a driving situation of the motor vehicle (1) to be determined, wherein an actuation method is selected from amongst a group of at least two possible actuation methods according to the determined driving situation, and wherein the switching elements are actuated according to the selected actuation method.

12 Claims, 1 Drawing Sheet

METHOD FOR OPERATING A MOTOR VEHICLE, DEVICE FOR A MOTOR VEHICLE, MOTOR VEHICLE

BACKGROUND OF THE INVENTION

The invention relates to a method for operating a motor vehicle which comprises an at least three-phase AC electrical machine, an electrical energy store and a power electronics system having a plurality of switching elements, wherein the switching elements of the power electronics system are actuated for electrically connecting the phases to the energy store, in order to produce a generator deceleration torque.

The invention further relates to a device, having a control apparatus.

The invention further relates to a motor vehicle having a device of this type.

Methods and motor vehicles of the above-mentioned type are known from the prior art. As a drive machine, for example, motor vehicles increasingly comprise at least one electrical machine. The electrical machine generally comprises a stator having at least three phases. The phases are configured in a distributed arrangement about a rotor such that, by an appropriate energization of the phases, the rotor is drivable or rotatable. In order to achieve a targeted energization of the phases, a power electronics system is provided, having a plurality of switching elements, wherein the phases are connected/connectable to an electrical energy store of the motor vehicle by means of the power electronics system. For example, for each phase, the power electronics system respectively comprises a half-bridge having two switching elements.

If the electrical machine is operated in a generator mode, alternating electric voltages are induced in the phases, and a generator deceleration torque is generated. The switching elements of the power electronics system are actuated for the electrical connection of the phases to the energy store, in order to generate the generator deceleration torque.

SUMMARY OF INVENTION

The method according to the invention provides an advantage in that, according to the situation, a highly appropriate actuation of switching elements in the power electronics system can be executed. To this end, according to the invention, it is provided that a driving situation of the motor vehicle is determined wherein, according to the driving situation thus determined, an actuation method is selected from a group of at least two potential actuation methods, and wherein the switching elements are actuated according to the actuation method selected. Depending upon which actuation method is selected, the switching elements are actuated by different actuation signals. For example, the switching elements, in the event of the selection of a first of the actuation methods, are actuated by different actuation signals than in the event of the selection of a second of the actuation methods. As the actuation signals are mutually different, generator-mode operation of the electrical machine is differently influenced by the selection of the actuation method in each case. It is assumed that, depending upon the driving situation of the motor vehicle, one or other of the actuation methods is particularly appropriate. The actuation methods are preferably previously defined or determined actuation methods. For each of the potential actuation methods, at least one driving situation exists in which the respective actuation method would be selected. Actuation signals for actuating the switching elements are preferably determined in accordance with the actuation method selected, a speed of rotation of the rotor and/or a rotor position angle of the rotor.

According to a preferred form of embodiment, it is provided that a clocking block method is selected as the actuation method. Clocking block methods are known in principle, and are also known as six-step mode or fundamental frequency clocking (FFC) methods. If the clocking block method is selected, the switching elements thus actuated will be switched once to a conducting state and once to a non-conducting state during each rotation of the rotor. The switching elements thus actuated are switched with a mutual temporal offset. The time interval during which the actuated switching elements are conductive corresponds to the time interval during which the actuated switching elements are non-conductive. If the switching elements are actuated in accordance with the clocking block method, a particularly high generator deceleration torque is generated, such that the motor vehicle decelerates rapidly.

The clocking block method is preferably selected, if the driving situation identified is an emergency braking situation. An emergency braking situation is to be understood as a driving situation in which a potentially rapid, particularly the most rapid possible deceleration of the motor vehicle is required. As the clocking block method generates a high generator deceleration torque, the clocking block method is a particularly appropriate actuation method, if an emergency braking situation is identified. Preferably, in the event of the identification of an emergency braking situation, at least one friction braking device of the motor vehicle is additionally actuated, for the generation of a friction braking torque.

According to a preferred form of embodiment, it is provided that a space vector pulse-width modulation method is selected as an actuation method. Space vector pulse-width modulation methods are also known in principle, and are also designated as "SVPWM". In a space vector pulse-width modulation method, actuated switching elements are actuated in a pulse-width modulated mode. The duty factor of pulse-width modulated actuation corresponds to the rotor angle position of the rotor. By the employment of the space vector pulse-width modulation method, in comparison with the clocking block method, a superior recuperation efficiency is achievable. Accordingly, the efficiency of conversion of the kinetic energy of the motor vehicle into electrical energy is greater.

A space vector pulse-width modulation method which delivers a high recuperation efficiency is preferably selected, if a standard driving situation is identified as the driving situation. A standard driving situation is to be assumed, for example, if the deceleration to be executed is a comfortable deceleration. A high recuperation efficiency is achieved, for example, by an appropriate definition of a target value for a torque-generating current and a target value for a flux-generating current. The torque-generating current and the flux-generating current are generally designated as Iq and Id respectively. In the field-oriented control of electrical machines, the space vector is described by means of the torque-generating current and the flux-generating current.

According to a preferred form of embodiment, it is provided that a space vector pulse-width modulation method which delivers a low recuperation efficiency is selected, if the driving situation is identified as downhill travel and/or travel with an at least substantially charged energy store. It is assumed that a state-of-charge of the energy store is not intended to exceed a maximum charge threshold value. An overshoot of the maximum charge threshold value can occur, for example, if the electrical machine, in the event of prolonged downhill travel and/or in the event that the energy store is already at least substantially charged, is operated in a generator mode. By the selection of a space vector pulse-width modulation method having a low recuperation efficiency, any overshoot of the maximum charge threshold value is prevented. A low recuperation efficiency is also preferably achieved by an appropriate definition of a target value for the torque-generating current and a target value for the flux-generating current. In the space vector pulse-width modulation method which delivers a high recuperation efficiency, different target values are defined than in the case of the space vector pulse-width modulation method which delivers a lower recuperation efficiency.

Preferably, for the identification of the driving situation, a release speed of an actuator is monitored, by means of which an acceleration torque of the motor vehicle is definable. It is established, for example, that an emergency braking situation is in force, if the release speed exceeds a specified release speed threshold value. If the release speed undershoots the specified release speed threshold value, the driving situation is specifically identified as a standard situation.

Preferably, for the identification of the driving situation, an operating speed and/or an operating force of an actuator is monitored, by means of which the deceleration torque for the motor vehicle is definable. If a user of the motor vehicle wishes to initiate emergency braking, it is thus assumed that the user will operate the actuator in a particularly rapid manner and with particular force. By the monitoring of the operating force and/or the operating speed, it can thus be reliably determined whether or not the driving situation is an emergency braking situation.

Preferably, the driving situation is determined according to data which are detected by means of an environment sensor system of the motor vehicle. Preferably, visual data in the environment of the motor vehicle are detected by the environment sensor system. According to data which are detected by means of the environment sensor system, it can be established, for example, whether or not an emergency braking situation is in force. It is determined, for example, that an emergency braking situation is in force, if it is established by means of the environment sensor system that a clearance between a motor vehicle and a further motor vehicle, or an object in the environment of the motor vehicle, undershoots a stipulated clearance threshold value.

Preferably, for the determination of the driving situation, a state-of-charge of the energy store is monitored. It can thus be established whether or not the driving situation involves travel with an at least substantially charged energy store.

Preferably, for the determination of the driving situation, a gradient of the road upon which the motor vehicle is traveling is monitored. It can thus be established whether or not the driving situation involves downhill travel. Preferably, the gradient is detected by means of a sensor apparatus of the motor vehicle. The sensor apparatus is, for example, a rotational speed sensor. Alternatively or additionally, a position of the motor vehicle is determined by reference to navigation satellite signals which are detected by means of a navigation unit of the motor vehicle. For the determination of gradient, the position thus determined is then compared with a map in which, in each case, a rising or a falling gradient is saved for the various potential positions.

The device according to the invention for a motor vehicle, which comprises an electrical machine having at least three phases, an electrical energy store and a power electronics system having a plurality of switching elements, wherein the phases of the electrical machine are electrically connected/connectable to the energy store by means of the power electronics system, is characterized by a control apparatus, which is specifically designed, in regulation use, to execute the method according to the invention. The above-mentioned advantages also proceed herefrom. Further preferred features and combinations of features proceed from the above description, and from the claims. The device preferably comprises at least one sensor apparatus, which is communicatively connected to the control apparatus, and is configured to detect data which correlate to the driving situation of the motor vehicle. The control apparatus is then configured to determine the driving situation, in accordance with the data thus detected.

The motor vehicle according to the invention comprises an electrical machine having at least three phases, an electrical energy store and a power electronics system having a plurality of switching elements, wherein the phases of the electrical machine are electrically connected/connectable to the energy store by means of the power electronics system, and is characterized by the device according to the invention. The above-mentioned advantages also proceed herefrom. Further preferred features and combinations of features proceed from the above description, and from the claims.

BRIEF DESCRIPTION OF THE DRAWINGS

The invention is described in greater detail hereinafter, with reference to the drawings. In the drawings.

DETAILED DESCRIPTION

Figure 1:
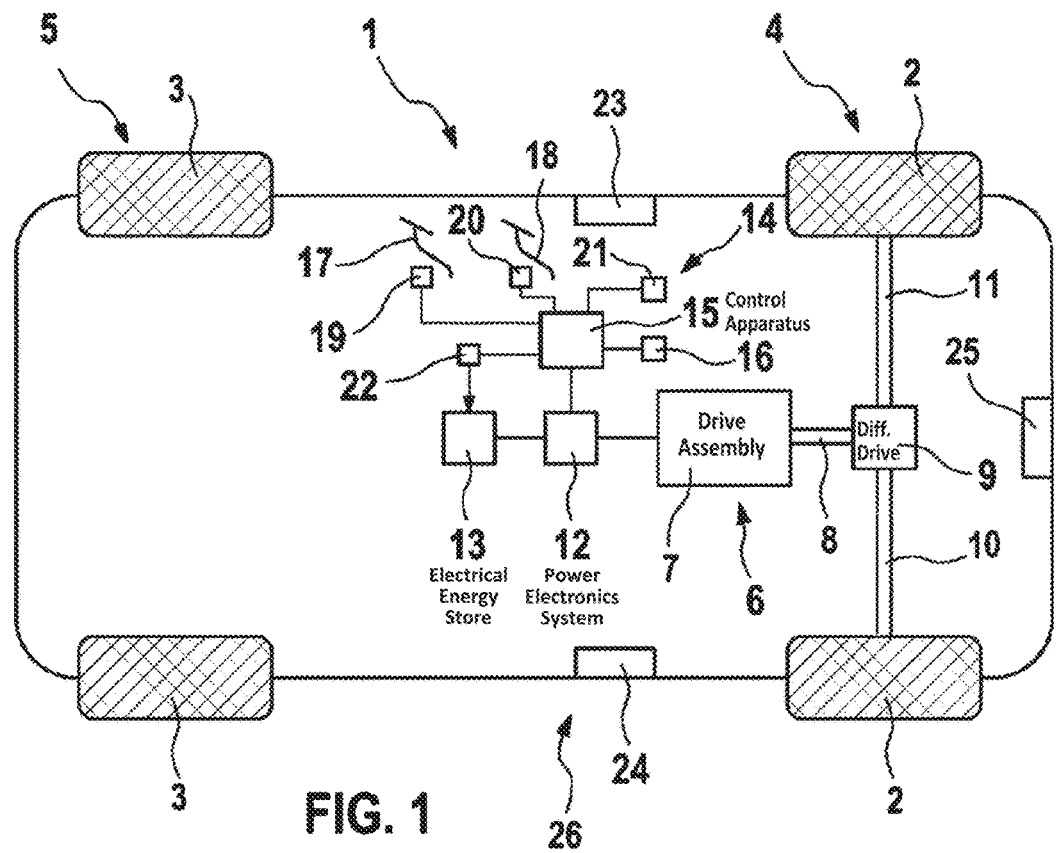
FIG. 1 shows a motor vehicle, in a simplified representation.

FIG. 1 shows a simplified representation of a motor vehicle 1. The motor vehicle 1 comprises four wheels 2 and 3, wherein the wheels 2 are assigned to a front axle 4, and the wheels 3 are assigned to a rear axle 5. The motor vehicle 1 comprises a drive assembly 6, having an electrical drive machine 7.

The drive machine 7 comprises an unrepresented rotor, which is arranged in a rotationally fixed manner on a drive shaft 8 of the motor vehicle 1. In the present case, the drive shaft 8 is connected in a rotationally fixed manner to the wheels 2 of the front axle 4 via a differential drive 9 and shafts 10 and 11. The drive machine 7 moreover comprises an unrepresented stator having three phases. The phases are configured in a distributed arrangement about the rotor such that, by an appropriate energization of the phases, the rotor is drivable or rotatable.

In order to achieve a targeted energization of the phases, the motor vehicle 1 comprises a power electronics system 12. The phases of the drive machine 7 are connected/connectable to an electrical energy store 13 of the motor vehicle 1 by means of the power electronics system 12. To this end, the power electronics system 12 respectively comprises, for each of the phases of the drive machine 7, a half bridge having two switching elements.

The drive machine 7 is operable in a generator mode. If the drive machine 7 is operated in a generator mode, the rotating rotor induces an alternating electric voltage in the phases, and a generator deceleration torque is generated, which decelerates the motor vehicle 1. By means of an appropriate actuation of the switching elements of the power electronics system 12, the induced alternating voltage can be rectified into a DC voltage for charging the energy store 13.

The motor vehicle 1 further comprises a device 14. The device 14 comprises a control apparatus 15, which is configured to actuate the switching elements of the power electronics system 12.

The device 14 further comprises a data memory 16, in which different actuation methods are saved. The data memory 16 is communicatively connected to the control apparatus 15, in order to deliver one or more of the actuation methods to the control apparatus 15.

The motor vehicle 1 further comprises a first actuator 17, wherein, by means of an actuation of the first actuator 17, an acceleration torque for the motor vehicle 1 is definable. Accordingly, the first actuator 17 is an accelerator pedal 17 of the motor vehicle 1. In order to generate the specified acceleration torque, the control apparatus 15 actuates the switching elements of the power electronics system 12 such that the phases are energized, in order to drive the rotor by the energization of the phases.

The motor vehicle 1 further comprises a second actuator 18, by means of which a deceleration torque for the motor vehicle 1 is definable. Accordingly, the second actuator 18 is a brake pedal 18 of the motor vehicle 1. In order to generate the specified deceleration torque, the control apparatus 15 actuates the switching elements of the power electronics system 12, such that the deceleration torque is generated by the operation of the drive machine 7 in a generator mode. Alternatively, preferably at least one unrepresented friction braking device is actuated, or both the power electronics system 12 and the at least one friction braking device are actuated, such that the at least one friction braking device and the drive machine 7 generate the deceleration torque in combination.

The device 14 further comprises a plurality of sensor apparatuses 19, 20, 21, 22, 23, 24 and 25.

A first of the sensor apparatuses 19 is configured to detect a speed of displacement of the first actuator 17. The first sensor apparatus 19 is communicatively connected to the control apparatus 15, in order to deliver the speed of displacement of the actuator 17 thus detected to the control apparatus 15.

A second of the sensor apparatuses 20 is configured to detect a speed of displacement of the second actuator 18. The second sensor apparatus 20 is communicatively connected to the control apparatus 15, in order to deliver the speed of displacement of the second actuator 18 thus detected to the control apparatus 15. Alternatively or additionally, the second sensor apparatus 20 is configured to detect an operating force of the second actuator 18, and to execute the delivery thereof to the control apparatus 15.

A third of the sensor apparatuses 21 is configured to detect a gradient of a road on which the motor vehicle 1 is traveling. For example, the third sensor apparatus 21 is a rotational speed sensor 21. The third sensor apparatus 21 is communicatively connected to the control apparatus 15, in order to deliver the gradient thus detected to the control apparatus 15.

A fourth of the sensor apparatuses 22 is configured to monitor a state-of-charge of the energy store 13. The fourth sensor apparatus 22 is communicatively connected to the control apparatus 15, in order to deliver the state-of-charge thus detected to the control apparatus 15.

A fifth 23, sixth 24 and seventh 25 of the sensor apparatuses are respectively an environment sensor 23, 24, 25 of the motor vehicle 1. In combination, the environment sensors 23, 24, 25 constitute an environment sensor system 26 of the motor vehicle 1, and are configured to detect an environment of the motor vehicle 1. The environment sensors 23, 24 and 25, for example, are radar sensors, LiDAR sensors, laser sensors or camera sensors. The environment sensors 23, 24 and 25 are communicatively connected to the control apparatus 15, in order to deliver environmental data thus detected by the environment sensors 23, 24 and 25 to the control apparatus 15.

Figure 2:
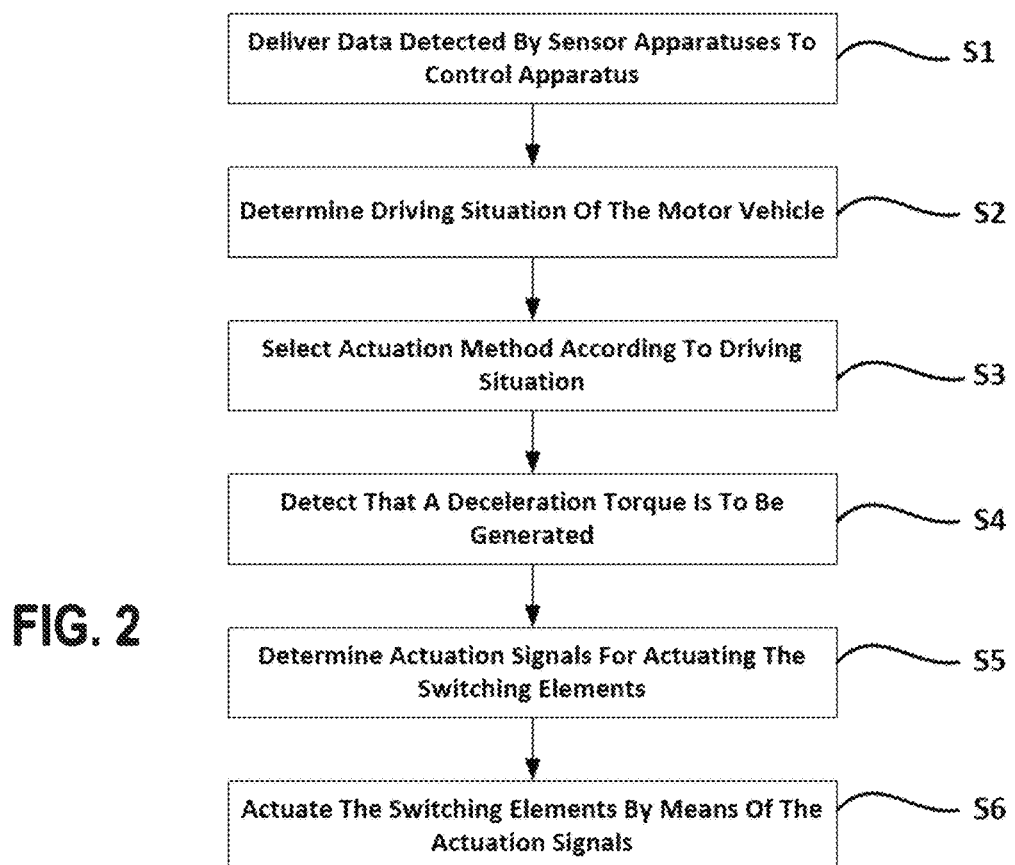
FIG. 2 shows a method for operating the motor vehicle.

Hereinafter, in accordance with FIG. 2, an advantageous method for operating the motor vehicle 1 is described in greater detail, with reference to a flow diagram.

In a first step S1, data are respectively detected by the sensor apparatuses 19, 20, 21, 22, 23, 24 and 25, and are delivered to the control apparatus 15.

In a second step S2, according to the data detected by the sensor apparatuses 19, 20, 21, 22, 23, 24 and 25, the control apparatus 15 determines a driving situation of the motor vehicle 1.

For example, the control apparatus 15 determines that the driving situation is an emergency braking situation, in the event that the speed of displacement of the first actuator 17 in the direction of an inoperative state of the first actuator 17, i.e. the release speed of the first actuator 17, exceeds a release speed threshold value. The control apparatus 15 will also detect that an emergency braking situation is in force, in the event that the speed of displacement of the second actuator 18 in an operating direction, i.e. the operating speed of the second actuator 18, exceeds an operating speed threshold value. The control apparatus 15 will also determine the presence of an emergency braking situation in the event that, by reference to data detected by the environment sensor system 26 or environmental data, it is determined that a clearance between the motor vehicle 1 and a further motor vehicle in the environment of the motor vehicle 1, and/or an object in the environment of the motor vehicle 1, undershoots a stipulated clearance threshold value.

If the gradient detected by the third sensor apparatus 21 exceeds a stipulated gradient threshold value, the control apparatus 15 thus identifies downhill travel as the driving situation. If the state-of-charge detected by the fourth sensor apparatus 22 exceeds a stipulated charge threshold value, the control apparatus 15 thus identifies travel with an at least substantially charged energy store 13 as the driving situation.

In step S2, if neither an emergency braking situation, nor downhill travel, nor travel with an at least substantially charged energy store 13 is in force, the control apparatus 15 thus identifies the driving situation as a standard driving situation.

In a third step S3, the control apparatus 15 selects one of the actuation methods which is saved in the data memory 16, according to the driving situation thus detected. In the event that, in step S2, the control apparatus 15 has detected an emergency braking situation, the control apparatus 15 thus selects a clocking block method as the actuation method in step S3. In the event that, in step S2, the control apparatus 15 has detected downhill travel or travel with an at least substantially charged energy store 13, the control apparatus 15 selects a space vector pulse-width modulation method which delivers a low recuperation efficiency as the actuation method in step S3. However, in the event that, in step S2, the control apparatus 15 has identified the driving situation as a standard driving situation, the control apparatus 15 selects a space vector pulse-width modulation method which delivers a high recuperation efficiency as the actuation method in step S3.

In a fourth step S4, the control apparatus 15 detects that a deceleration torque is to be generated, for example in response to the operation of the second actuator 18.

In a fifth step S5, the control apparatus 15 determines actuation signals for the actuating the switching elements of the power electronics system 12. The control apparatus 15 determines actuation signals at least in accordance with the selected actuation method. Preferably, the control apparatus 15 also determines actuation signals in accordance with a speed of rotation of the rotor and/or a rotor position angle of the rotor.

In a sixth step S6, the control apparatus 15 then actuates the switching elements of the power electronics system 12 by means of the actuation signals thus determined, in order to operate the drive machine 7 in a generator mode, for the generation of a generator deceleration torque. The switching elements are thus actuated in accordance with the actuation method selected. In the event that, in step S2, an emergency braking situation has been identified as the driving situation, preferably at least one of the unrepresented friction braking devices is additionally actuated. Accordingly, both a generator deceleration torque and a friction braking torque are generated for the deceleration of the motor vehicle 1.

The invention claimed is:

1. A method for operating a motor vehicle which comprises an electrical machine (7) having at least three phases, an electrical energy store (13) and a power electronics system (12) having a plurality of switching elements, the method comprising:
    determining a driving situation of the motor vehicle (1),
    according to the driving situation thus determined, selecting an actuation method from a group of at least two potential actuation methods, and
    actuating the plurality of switching elements according to the actuation method selected, wherein actuating the plurality of switching elements of the power electronics system (12) electrically connects phases to the energy store (13) to produce a generator deceleration torque,
    wherein a clocking block method is selected as the actuation method when an emergency braking situation is identified as the driving situation.

2. The method as claimed in claim 1, wherein a space vector pulse-width modulation method is selected as the actuation method.

3. The method as claimed in claim 2, wherein a space vector pulse-width modulation method which delivers a high recuperation efficiency is selected, when a standard driving situation is identified as the driving situation.

4. The method as claimed in claim 2, wherein a space vector pulse-width modulation method which delivers a low recuperation efficiency is selected, when the driving situation is identified as downhill travel.

5. The method as claimed in claim 1, wherein, for the identification of the driving situation, a release speed of an actuator (17) is monitored, by means of which an acceleration torque of the motor vehicle (1) is defined.

6. The method as claimed in claim 1, wherein, for the identification of the driving situation, an operating speed an actuator (18) is monitored, by means of which the deceleration torque for the motor vehicle (1) is defined.

7. The method as claimed in claim 1, wherein the driving situation is determined according to data which are detected by means of an environment sensor system (26) of the motor vehicle (1).

8. The method as claimed in claim 1, wherein, for the determination of the driving situation, a state-of-charge of the energy store (13) is monitored.

9. The method as claimed in claim 1, wherein, for the determination of the driving situation, a gradient of the road upon which the motor vehicle (1) is traveling is monitored.

10. The method as claimed in claim 2, wherein a space vector pulse-width modulation method which delivers a low recuperation efficiency is selected, when the driving situation is identified as travel with a charged energy store.

11. A device for a motor vehicle which comprises an electrical machine (7) having at least three phases, an electrical energy store (13) and a power electronics system (12) having a plurality of switching elements, wherein the phases of the electrical machine (7) are electrically connectable to the energy store (13) by means of the power electronics system (12), and a control apparatus (15) configured to
    determine a driving situation of the motor vehicle (1),
    according to the driving situation thus determined, select an actuation method from a group of at least two potential actuation methods, and
    actuate the plurality of switching elements according to the actuation method selected, wherein actuating the plurality of switching elements of the power electronics system (12) electrically connects phases to the energy store (13) to produce a generator deceleration torque,
    wherein a clocking block method is selected as the actuation method when an emergency braking situation is identified as the driving situation.

12. A motor vehicle comprising:
    an electrical machine (7) having at least three phases,
    an electrical energy store (13),
    a power electronics system (12) having a plurality of switching elements, wherein the phases of
    the electrical machine (7) are electrically connectable to the energy store (13) by means of the
    power electronics system (12), and a control apparatus configured to
        determine a driving situation of the motor vehicle (1),
        according to the driving situation thus determined, select an actuation method from a group of at least two potential actuation methods, and
        actuate the plurality of switching elements according to the actuation method selected, wherein actuating the plurality of switching elements of the power electronics system (12) electrically connects phases to the energy store (13) to produce a generator deceleration torque,
    wherein, for the determination of the driving situation, an operating force of an actuator (18) is monitored, by means of which the deceleration torque for the motor vehicle is defined.

* * * * *